United States Patent
Bhogal et al.

(10) Patent No.: US 7,711,350 B2
(45) Date of Patent: May 4, 2010

(54) TRACKING COMMUNICATIONS USAGE TIME

(75) Inventors: Kulvir S. Bhogal, Fort Worth, TX (US); Nizam Ishmael, Jr., Austin, TX (US); Javid Jameossanaie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2363 days.

(21) Appl. No.: 09/881,873

(22) Filed: Jun. 14, 2001

(65) Prior Publication Data

US 2002/0193092 A1  Dec. 19, 2002

(51) Int. Cl.
H04M 11/00 (2006.01)
H04M 1/00 (2006.01)
H04M 15/00 (2006.01)

(52) U.S. Cl. .............. 455/405; 455/406; 455/407; 455/550.1; 379/114.01; 379/121.02

(58) Field of Classification Search ......... 455/405–409, 455/418–420, 414.1–414.2, 432.3, 453, 515, 455/550.1, 556.2, 565–566, 557–558, 403, 455/415, 514; 379/138, 114.01–114.06, 379/111–112, 1, 114.09–114.1, 114.22, 121.04–121.05, 379/126, 133–134, 114.27, 130–131, 121.02, 379/121.03, 100.01–100.05, 100.06, 112.01, 379/114.12, 114.17, 114.2, 127.04, 142.01; 714/4

See application file for complete search history.

(56) References Cited

U.S. PATENT DOCUMENTS

| | | | | |
|---|---|---|---|---|
| 4,200,771 A | * | 4/1980 | Kraushaar et al. | 379/138 |
| 5,233,642 A | * | 8/1993 | Renton | 455/405 |
| 5,291,543 A | | 3/1994 | Freese et al. | |
| 5,684,861 A | * | 11/1997 | Lewis et al. | 455/405 |
| 5,875,393 A | * | 2/1999 | Altschul et al. | 455/407 |
| 5,909,485 A | * | 6/1999 | Martin et al. | 379/144 |
| 5,943,406 A | | 8/1999 | Leta et al. | |
| 5,960,070 A | * | 9/1999 | O'Donovan | 379/114.01 |
| 5,966,509 A | * | 10/1999 | Abe et al. | 714/4 |
| 5,983,091 A | * | 11/1999 | Rodriguez | 455/405 |
| 5,987,107 A | * | 11/1999 | Brown | 379/114 |
| 5,996,509 A | * | 12/1999 | Lai | 108/51.3 |
| 6,044,258 A | * | 3/2000 | Abdella | 455/408 |
| 6,112,077 A | * | 8/2000 | Spitaletta et al. | 455/407 |
| 6,138,002 A | | 10/2000 | Alperovich et al. | |
| 6,141,404 A | * | 10/2000 | Westerlage et al. | 379/118 |
| 6,198,915 B1 | * | 3/2001 | McGregor et al. | 455/406 |

(Continued)

FOREIGN PATENT DOCUMENTS

DE  19646892 A1 * 5/1998

(Continued)

OTHER PUBLICATIONS

An article featuring the Nokia 3210 cellular phone specifications entitled, "NOKIA Connecting People" (Author unknown, Date unknown, 5 pp).

*Primary Examiner*—Meless N Zewdu
(74) *Attorney, Agent, or Firm*—David A. Mims, Jr.; Amy J. Pattillo (57) ABSTRACT

The invention provides a method for tracking communications usage time. Time increments are counted in response to a call. A call count is determined based on time increments. The call count is modified based on calling plan parameters.

27 Claims, 5 Drawing Sheets

U.S. PATENT DOCUMENTS

| | | | |
|---|---|---|---|
| 6,275,708 B1 * | 8/2001 | Lahtinen | 455/458 |
| 6,442,406 B1 * | 8/2002 | Harris et al. | 455/565 |
| 6,532,366 B1 * | 3/2003 | Chung et al. | 455/445 |
| 6,785,372 B1 * | 8/2004 | Moss et al. | 379/114.2 |
| 6,970,692 B2 * | 11/2005 | Tysor | 455/405 |
| 2002/0151293 A1 * | 10/2002 | Tysor | 455/406 |

FOREIGN PATENT DOCUMENTS

| | | | |
|---|---|---|---|
| JP | 07066909 A | * | 3/1995 |
| JP | 2001203828 A | * | 7/2001 |

* cited by examiner

TRACKING COMMUNICATIONS USAGE TIME

TECHNICAL FIELD OF THE INVENTION

The present invention relates generally to communications devices, and more particularly to a method for tracking call usage time.

BACKGROUND OF THE INVENTION

Users of communications systems, such as cellular and wireless telephones or personal digital assistant devices (PDAs), may require an accurate estimation of time connected to a provider, or usage time. Cellular phone users, for example, may be given a monthly ration of usage time minutes and consequently do not want to exceed the time ration. The providers of cellular communications calling plans, however, do not typically disclose a real-time count of usage time to their users.

The real-time count of usage time may afford the user knowledge of how many minutes they have consumed in the allotted time ration. In addition, the real-time count could be used in conjunction with calling plan parameters (i.e. time and day of the call, peak or off-peak call, incoming versus outgoing call, etc . . . ) to estimate call billing and more accurately depict usage time counts. Since providers do not typically disclose the real-time count, an effort has been made to estimate the usage time within the communications device.

Cellular telephones typically provide a simple built-in timer that indicates the duration of a call and the total usage time since the timer was last reset. These simple timers do not allow the user to track usage of certain calls that may have associated calling plan parameters or rates offered by the provider. Therefore, several strategies have been developed to attempt accurate estimation of usage time that takes the calling plan parameters into account. On the other hand, the current strategies have failed to utilize several key calling plan parameters into their usage time estimates.

The U.S. Pat. No. 6,198,915 B1 issued Mar. 6, 2001 to McGregor et al. is an example of a mobile phone with internal accounting. The invention provides a mobile phone unit with accounting capabilities capable of real-time call debiting to account for the billing parameters of the unit operated in a multi zone network. The accounting system includes a complex billing algorithm with a multiple factor accounting protocol to account for local charges, roaming charges when the mobile phone unit moves from one zone to another, long distance charges, international charges, and surcharges. The algorithm is stored within the phone unit, together with a rate schedule that may be updated periodically by the provider.

The U.S. Pat. No. 5,684,861 issued Nov. 4, 1997 to Lewis et al. is an example of an apparatus and method for monitoring cellular telephone usage. The invention provides a small, wireless, battery operated monitoring apparatus installed on a cellular telephone in close proximity to a telephone antenna. The monitoring device monitors telephone usage by detecting and tracking radio frequency signal transmissions from the antenna to a base station. The monitoring device includes a microprocessor that monitors telephone usage, and generates statistical information indicative of telephone usage. In an alternative embodiment, the monitoring device may be incorporated into the circuitry of the cellular telephone. The device may be capable of reporting cellular telephone usage in a number of categories including total connect time, peak time used, off-peak time used, unused peak and off-peak time remaining.

In summary, providers of communications device service do not typically disclose real-time counts of usage time to their users. The described and other strategies may provide reasonable call usage estimation. The current strategies, however, do not utilize several key calling plan parameters and, thus, may not provide accurate and complete usage time estimates. A superior method of estimating telephone usage time would accurately count call usage time while accounting for the key calling plan parameters. Therefore, it would be desirable to achieve a strategy for tracking communications usage time that overcomes the aforementioned and other disadvantages.

SUMMARY OF THE INVENTION

One aspect of the invention provides a method of tracking communications usage time. Time increments are counted in response to a call. A call count is determined based on the time increments and the call count is modified based on calling plan parameters. The modified call count may be added and an accumulated call count may be determined. The modified call count may be subtracted from a time ration to determine a remaining call time. Modifying the call count may comprise: rounding the call count, subtracting an initial open connection time from the call count, discounting an incoming call, discounting a nighttime call, and discounting a weekend call. A special usage parameter may be provided. A special count may be calculated based on the special usage parameter and the modified call count. The special usage parameter may comprise a long distance parameter, and the special call count may comprise a long distance usage count. The special usage parameter may comprise a local distance parameter, and the special call count may comprise a local distance usage count. The special usage parameter may comprise a nighttime usage parameter, and the special call count may comprise a nighttime usage count. The special usage parameter may comprise a weekend usage parameter, and the special call count may comprise a weekend usage count. The special usage parameter may comprise a peak usage parameter, and the special call count may comprise a peak usage count. The special usage parameter may comprise an off-peak usage parameter, and the special call count may comprise an off-peak usage count.

Another aspect of the invention provides a computer usable medium including a program for tracking communications usage time comprising: computer readable program code for counting time increments in response to a call, computer readable program code for determining a call count based on time increments, and computer readable program code for modifying the call count based on calling plan parameters.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
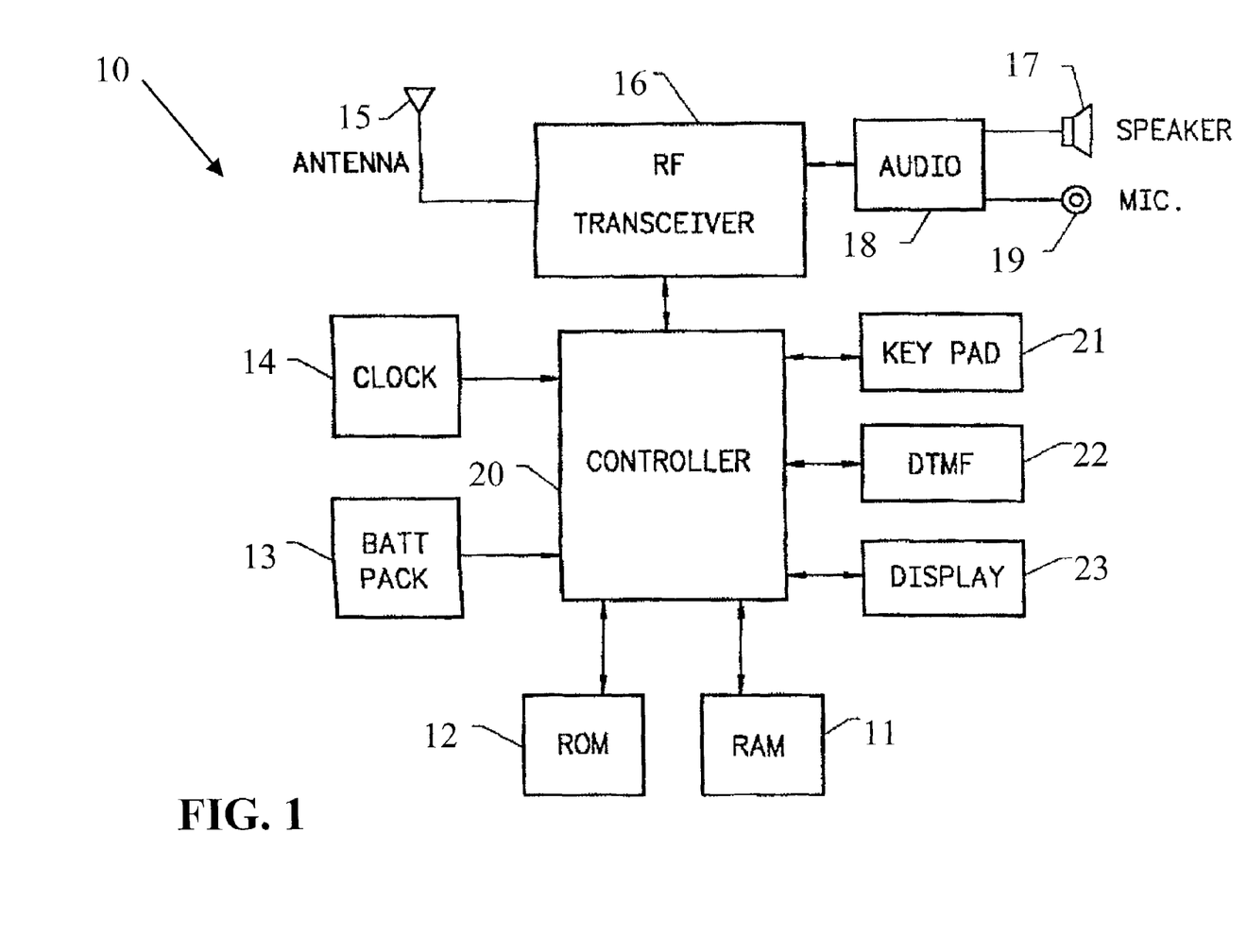
FIG. 1 is a schematic overview of one embodiment of the present invention.

Referring to FIG. 1, one embodiment of the present invention is shown in the aggregate as a cellular telephone unit 10. The phone unit 10 may support a controller 20 that coordinates the functions of the unit. The controller 20 may have an associated memory comprising an EPROM chip 12 that stores the firmware that forms the code operating code of the unit 10. At least one RAM chip 11 may be electrically connected to the controller 20. The RAM chips 11 may provide programmable memory that may include command codes and data storage for logging call data. A clock chip 14 may be associated with the controller 20 to provide date and timer functions for the phone unit 10. The date and timer functions may comprise data for call logging purposes.

An antenna 15 provides a means for the phone unit 10 to communicate with a cellular phone provider. The antenna 15 may be electrically connected to an RF transceiver 16 associated with the controller 20. The RF transceiver 16 may be connected with an analog audio circuit 18 and associated earphone 17 output and microphone 19 input. The audio circuit 18 may be connected to the controller 20 and may provide audio output of touch-tones, warning signals, and the like. The unit 10 may include a DTMF decoder chip 22 and a keypad 21 for a variety of functions. The functions may comprise menu navigation, entry of data and telephone numbers, and general operation of the unit 10 by an operator. Furthermore, the unit 10 may comprise a LCD or LED display 23 for communicating phone numbers, account data, navigation menus, and the like with the unit 10 operator. A battery 13 connected to the controller 20 may power the unit 10.

The controller 20 may comprise an algorithm or method written in computer readable program code run by a microprocessor. Those skilled in the art will recognize that the controller 20 may function as part of a cellular or mobile telephone unit, a PDA device, or other telecommunications device. For the purposes of describing the operation of an embodiment, the controller 20 comprises a microprocessor running a program in a cellular telephone unit 10.

Figure 2:
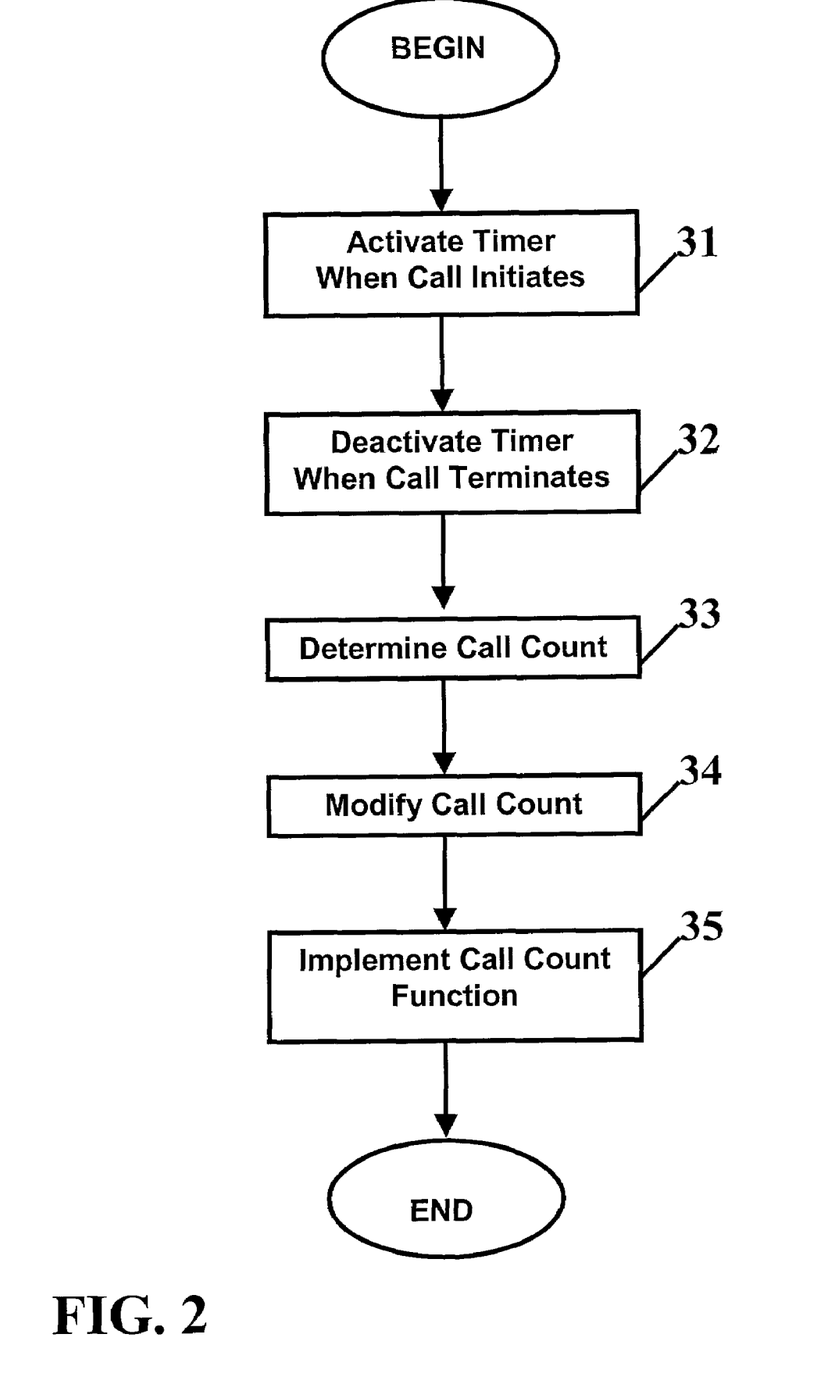
FIG. 2 is a schematic diagram of an algorithm according to another embodiment of the present invention.

Referring to FIG. 2, one embodiment of the present invention is shown wherein the controller 20 may execute a program. During execution of the program, a timer may be activated when a call is initiated (block 31). The call may be any open communication between the unit 10 and a second party. The call initiation may comprise placing a call from the unit 10, receiving a call, or starting a transmission of information between the unit 10 and second party. After the call is initiated, the timer may be activated to count time increments of the call. The time increments may comprise seconds, minutes, or any other suitable division of time. The timer may comprise the clock chip 14 and communicate the date and timer data to the controller 20. The timer may continue to count time increments until the call is terminated (block 32). A call count may be determined (block 33) based on the time increments of the call. In one embodiment, the call count may comprise total call time duration in minutes and seconds.

The call count may then be modified (block 34) based on calling plan parameters. The calling plan parameters may be based on a variety of factors reflecting calling plans offered by cellular phone plan providers. Modifying the call count may comprise rounding the call count to the nearest minute. Providers typically bill cell phone calls up to the next whole minute. For example, a four-minute-five-second call would be billed as a five-minute call. In one embodiment, the call count may be rounded up to a nearest whole minute for each call.

Modifying the call count may comprise subtracting an initial open connection time from the call count. Calling plans may provide a discount for periods within a call (e.g., first incoming minute free). In one embodiment, the modified call count may be calculated by discounting a first minute from the call count by simply subtracting one minute from the determined call count.

Modifying the call count may comprise discounting an incoming call. Calling plans may offer reduced billing for those calls made into the unit 10. The reduced billing is typically in the form of a predetermined discount. For example, an incoming call may be free. In one embodiment, incoming calls may be discounted for an incoming call thereby diminishing the call count proportional to the predetermined discount. The call may be fully discounted so that the call count would be reset to zero.

Modifying the call count may comprise discounting a nighttime or weekend call. As with the incoming call, calling plans may offer reduced billing for calls occurring during nighttime and/or weekends. Providers typically determine cutoff times that boundary nighttime hours and weekend days. The cutoff times may be transmitted to the unit 10 by the provider or entered into the unit via the keypad. In one embodiment, the call count may be discounted for a nighttime call and weekend call thereby diminishing the call count proportional to the predetermined discount.

The aforementioned modifications to the call count may provide more accurate estimates of usage time because the modifications are based on the calling plan parameters. Those skilled in the art will recognize that providers may offer other calling plan parameters such as discounted holiday calling, or the like, that may be used to modify the call count to achieve a more accurate usage time estimate.

After the call count has been modified (block 34), a call count function may be executed (block 35). The call count function may include a number of functions that provides additional features to the unit 10 operator. The functions may be executed as desired by the operator and may be controlled through keypad 21 operation.

Figure 3:
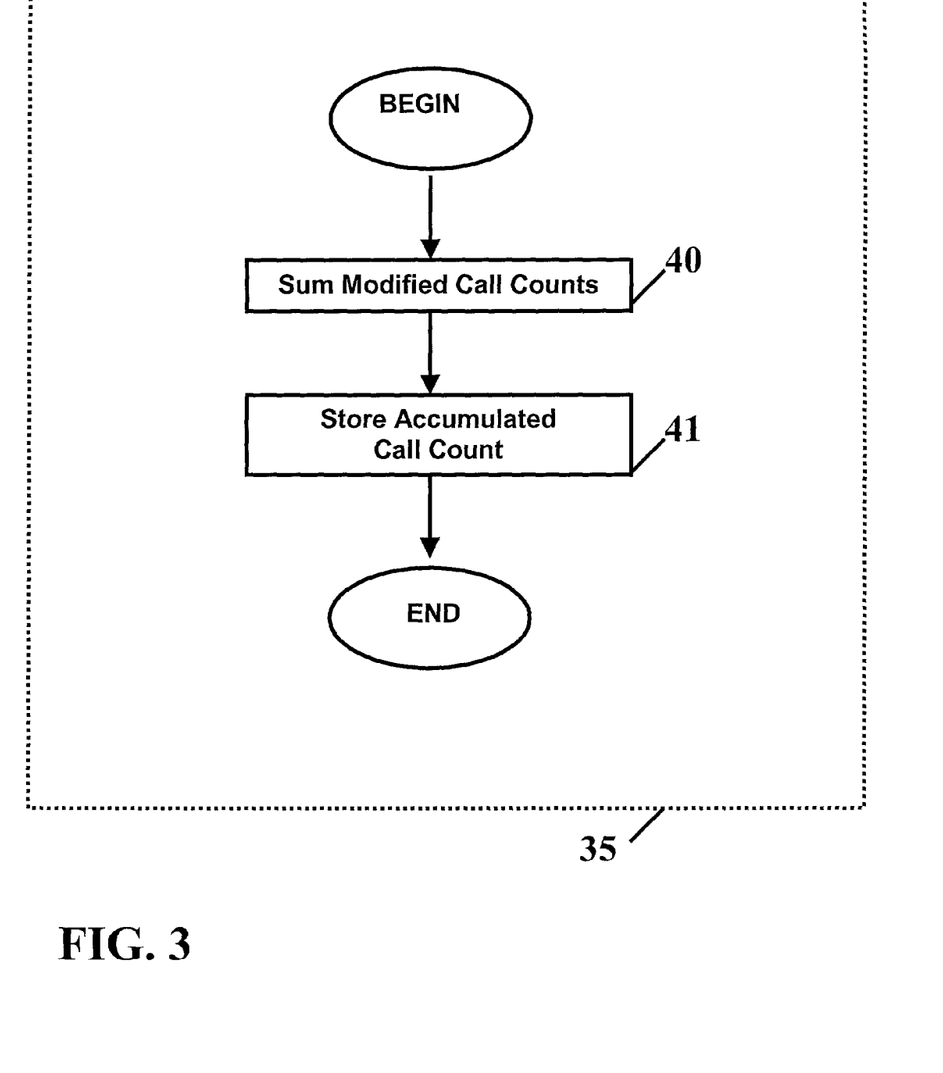
FIG. 3 is a schematic diagram of a portion of the algorithm in FIG. 2.

A detailed view of one call count function is shown in FIG. 3. The call count function may allow the modified call count from each call to be summed (block 40) to determine an accumulated call count. The accumulated call count may then be stored in the memory of the unit (block 41). The operator may then access the accumulated call count data from the unit memory as desired. In one embodiment, the accumulated call count may be accessed through a keypad 21 operation and conveyed to the operator via the display 23. The accumulated call count may also be reset through a keypad 21 operation as needed, as with the beginning of a billing cycle. Therefore, the accumulated call count may provide the operator with an accurate estimate of total usage time for a given time period.

Figure 4:
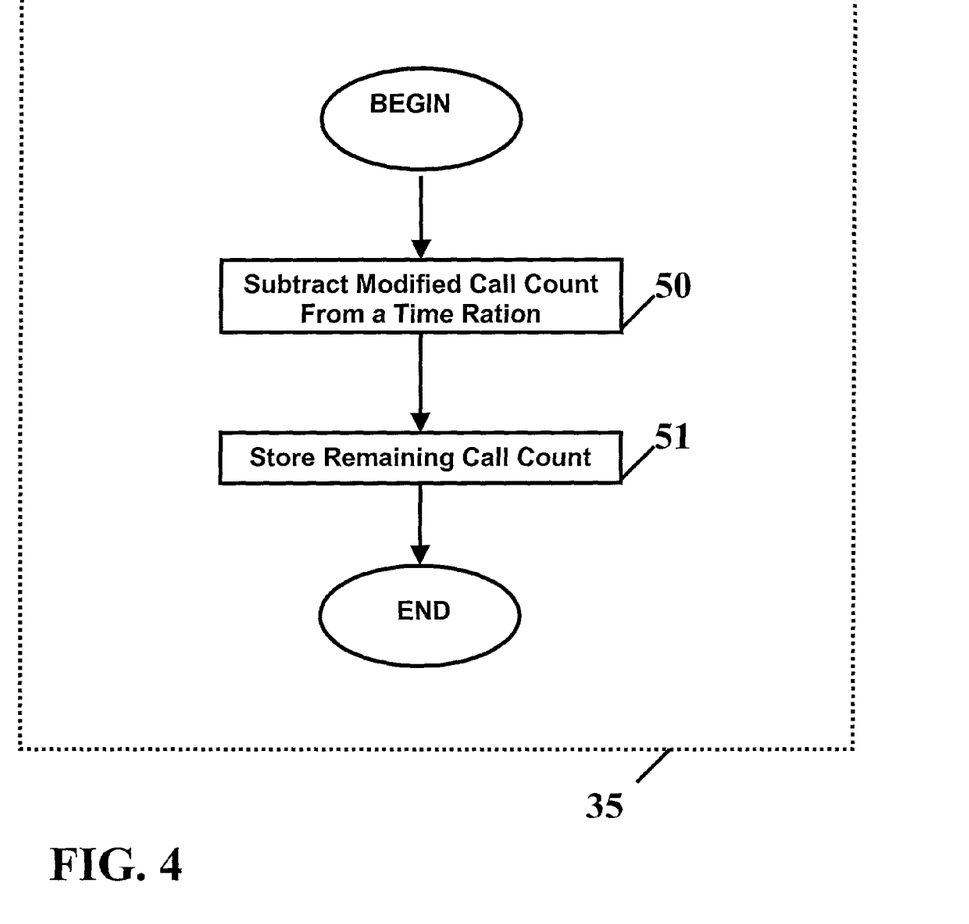
FIG. 4 is a schematic diagram of a portion of the algorithm in FIG. 2.

A detailed view of another call count function is shown in FIG. 4. The modified call count may be subtracted from a time ration (block 50) to determine a remaining call count. The remaining call count may then be stored in the memory of the unit (block 51). The operator may then access the remaining call count data from the unit memory as desired. In one embodiment, the provider may offer a call time ration per billing cycle from which the modified call count is continuously subtracted. The remaining call count information may then be accessed, displayed, and reset in a similar manner as the accumulated call count. Therefore, the remaining call count may provide the operator with an accurate estimate of how much usage time is remaining for a given time period.

Figure 5:
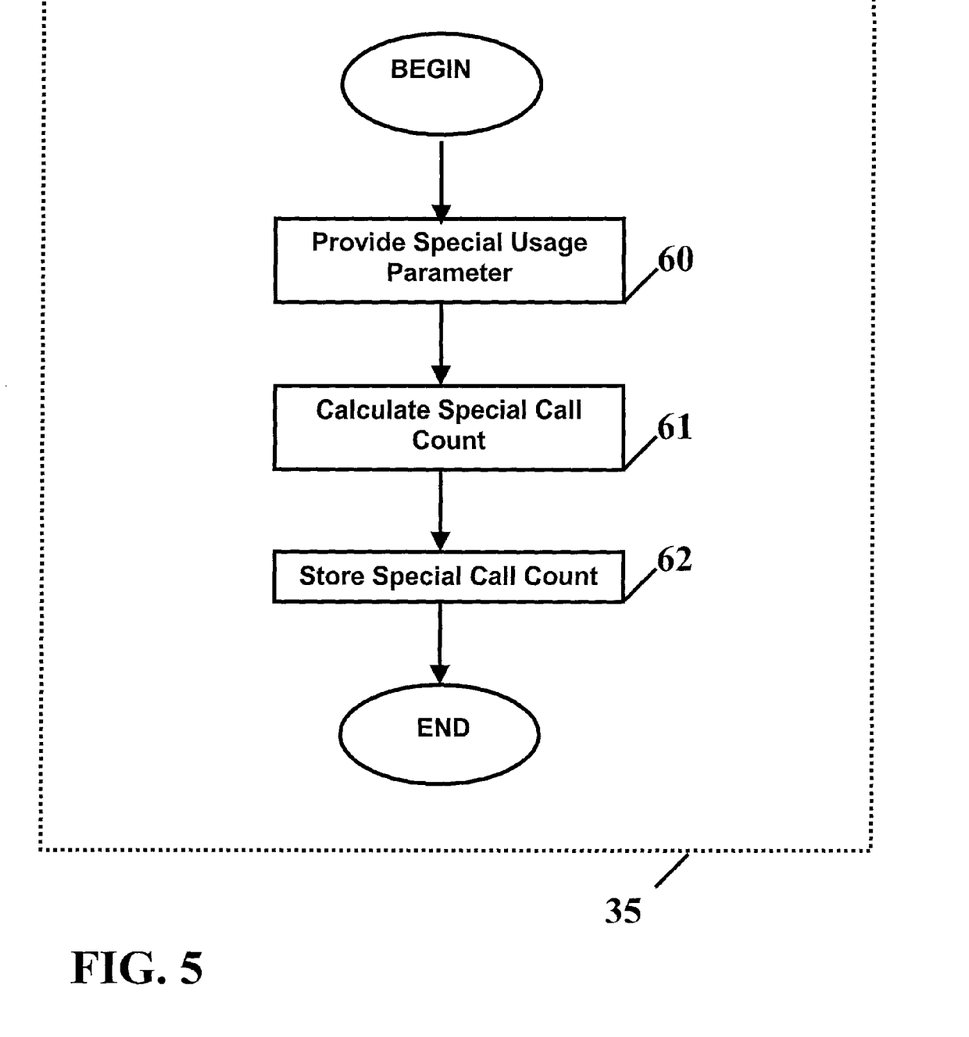
FIG. 5 is a schematic diagram of a portion of the algorithm in FIG. 2.

Yet another call count function is shown in FIG. 5. This call count function may include providing a special usage parameter (block 60) and calculating a special call count (block 61) based on the special usage parameter and the modified call count. The special usage parameter may be input to the controller 20 via the keypad 21, transmitted from the provider, preprogrammed in the unit memory 11, 12, or the like. The controller 20 may integrate the modified call count, the special usage parameter, and other call information to generate the special call count. The special call count may then be stored in the unit memory (block 62) and accessed, displayed, and reset in a similar manner as the accumulated and remaining call counts. The special call count may provide the operator with at least one additional call count wherein information on special call usage is provided. Furthermore, the special call count may be summed or subtracted from a time ration, as described for the other call count functions, to provide the operator with additional usage time information.

In one embodiment, the special usage parameter may comprise a long distance parameter, and the special call count may comprise a long distance usage count. Furthermore, the special usage parameter may comprise a local distance parameter, and the special call count may comprise a local distance usage count. The long distance parameter and the local distance parameter may comprise a listing of long distance and local area codes, respectively. The controller 20 may use the area code information to determine if the call is long or local distance. Once the call has been identified according to the area code parameters, long and local distance call counts may be calculated. In a like manner, special usage counts may be generated for nighttime, weekend, peak, and off-peak calls.

As another example, the peak and off-peak parameters of one embodiment may comprise a schedule of times calls would be considered to be peak or off-peak. The parameters and the clock chip 14 timer and date information may be integrated by the controller 20 to determine if a call falls under a given category. The corresponding special call count would then be calculated for that category. Those skilled in the art will recognize that a large number and variety of special call count categories may exist and that providers may offer additional categories in the future. The additional call counts may provide the user with a more complete call usage profile.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of tracking communications usage time by a controller within a phone unit during a call comprising:
   the controller within the phone unit performing the following steps;
   counting time increments in response to initiation of the call;
   in response to termination of the call, determining a call count of a total call time duration based on the time increments;
   modifying the call count based on calling plan parameters by reducing the call count proportional to a pre-determined discount specified in the calling plan parameters for discounting an incoming call;
   summing the modified call count with at least one other call count from at least one other call; and
   determining an accumulated call count from the summing.

2. The method of claim 1 further comprising; subtracting the modified call count from a time ration; and determining a remaining call count from the subtracting.

3. The method of claim 1 wherein modifying the call count comprises rounding the call count up to a nearest whole minute based on a setting in the calling plan parameters to round to the next whole minute.

4. The method of claim 1 wherein modifying the call count comprises subtracting an initial open connection time from the call count.

5. The method of claim 1 wherein modifying the call count based on calling plan parameters comprises reducing the call count proportional to a pre-determined discount specified in the calling plan parameters for discounting a nighttime call within cutoff times for nighttime hours.

6. The method of claim 1 wherein modifying the call count based on calling plan parameters comprises reducing the call count proportional to a pre-determined discount specified in the calling plan parameters for discounting a weekend call within cutoff times for weekend days.

7. The method of claim 1 further comprising; providing a special usage parameter; calculating a special call count based on the special usage parameter and the modified call count.

8. The method of claim 7 wherein the special usage parameter comprises a long distance parameter, and the special call count comprises a long distance usage count.

9. The method of claim 7 wherein the special usage parameter comprises a local distance parameter, and the special call count comprises a local distance usage count.

10. The method of claim 7 wherein the special usage parameter comprises a nighttime usage parameter, and the special call count comprises a nighttime usage count.

11. The method of claim 7 wherein the special usage parameter comprises a weekend usage parameter, and the special call count comprises a weekend usage count.

12. The method of claim 7 wherein the special usage parameter comprises a peak usage parameter, and the special call count comprises a peak usage count.

13. The method of claim 7 wherein the special usage parameter comprises an off-peak usage parameter, and the special call count comprises an off-peak usage count.

14. A computer readable medium including computer program code for tracking communications usage time comprising:
   the computer readable program code for counting time increments in response to initiation of a call;
   the computer readable program code in response to termination of the call, for determining a call count of a total call time duration based on the time increments;
   the computer readable program code for modifying the call count based on calling plan parameters by reducing the call count proportional to a pre-determined discount specified in the calling plan parameters for discounting an incoming call;
   the computer readable program code for summing the modified call count with at least one other call count from at least one other call; and
   the computer readable program code for determining an accumulated call count from the summing.

15. The computer readable medium of claim 14 further comprising;

the computer readable program code for subtracting the modified call count from a time ration; and the computer readable program code for determining a remaining call count from the subtracting.

16. The computer readable medium of claim 14 wherein modifying the call count comprises rounding the call count up to a nearest whole minute based on a setting in the calling plan parameters to round to the next whole minute.

17. The computer readable medium of claim 14 wherein modifying the call count comprises subtracting an initial open connection time from the call count.

18. The computer readable medium of claim 14 wherein modifying the call count based on calling plan parameters comprises reducing the call count proportional to a pre-determined discount specified in the calling plan parameters for discounting a nighttime call within cutoff times for nighttime hours.

19. The computer readable medium of claim 14 wherein modifying the call count based on calling plan parameters comprises reducing the call count proportional to a pre-determined discount specified in the calling plan parameters for discounting a weekend call within cutoff times for weekend days.

20. The computer readable medium of claim 14 further comprising;

the computer readable program code for providing a special usage parameter;

the computer readable program code for calculating a special call count based on the special usage parameter and the modified call count.

21. The computer readable medium of claim 20 wherein the special usage parameter comprises a long distance parameter, and the special call count comprises a long distance usage count.

22. The computer readable medium of claim 20 wherein the special usage parameter comprises a local distance parameter, and the special call count comprises a local distance usage count.

23. The computer readable medium of claim 20 wherein the special usage parameter comprises a nighttime usage parameter, and the special call count comprises a nighttime usage count.

24. The computer readable medium of claim 20 wherein the special usage parameter comprises a weekend usage parameter, and the special call count comprises a weekend usage count.

25. The computer readable medium of claim 20 wherein the special usage parameter comprises a peak usage parameter, and the special call count comprises a peak usage count.

26. The computer readable medium of claim 20 wherein the special usage parameter comprises an off-peak usage parameter, and the special call count comprises an off-peak usage count.

27. A method of tracking communications usage time by a controller of a cellular telephone unit during a call comprising:

the controller within the cellular telephone unit performs the following steps;

counting time increments by a timer in response to initiation of a call;

determining a call count of a total duration of the call based on time increments counted by the timer;

modifying the call count based on calling plan parameters for the cellular telephone unit by reducing the call count proportional to a pre-determined discount specified in the calling plan parameters for discounting an incoming call; and storing the modified call count in a memory of the cellular telephone unit.

* * * * *